(12) United States Patent
Rakesh Yoganandan et al.

(10) Patent No.: US 12,511,037 B1
(45) Date of Patent: Dec. 30, 2025

(54) METHOD AND DEVICE FOR TYPING VISUALIZATION

(71) Applicant: Apple Inc., Cupertino, CA (US)

(72) Inventors: Arun Rakesh Yoganandan, San Francisco, CA (US); Aaron Mackay Burns, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/899,731

(22) Filed: Sep. 27, 2024

Related U.S. Application Data

(63) Continuation of application No. 17/506,862, filed on Oct. 21, 2021, now abandoned.

(60) Provisional application No. 63/105,494, filed on Oct. 26, 2020.

(51) Int. Cl.
*G06F 3/04895* (2022.01)
*G06F 3/01* (2006.01)
*G06F 3/04815* (2022.01)
*G06F 3/04886* (2022.01)

(52) U.S. Cl.
CPC .......... *G06F 3/04895* (2013.01); *G06F 3/013* (2013.01); *G06F 3/04815* (2013.01); *G06F 3/04886* (2013.01)

(58) Field of Classification Search
CPC .. G06F 3/04895; G06F 3/013; G06F 3/04815; G06F 3/04886
See application file for complete search history.

(56) References Cited

U.S. PATENT DOCUMENTS

| | | | | |
|---|---|---|---|---|
| 5,736,976 | A * | 4/1998 | Cheung | G06F 3/0489 341/23 |
| 6,611,253 | B1 * | 8/2003 | Cohen | G06F 3/0426 345/173 |
| 8,228,315 | B1 * | 7/2012 | Starner | G06F 3/0304 345/175 |
| 10,181,219 | B1 * | 1/2019 | Murphy | A63F 13/26 |
| 10,275,023 | B2 * | 4/2019 | McKenzie | G06F 3/011 |
| 10,338,673 | B2 * | 7/2019 | Chen | G06V 40/10 |
| 10,394,342 | B2 * | 8/2019 | Imm | G06F 3/038 |
| 10,802,695 | B2 * | 10/2020 | Daniels | G06F 3/011 |
| 10,824,867 | B1 * | 11/2020 | Assam | G06Q 40/08 |
| 10,916,065 | B2 * | 2/2021 | Furtwangler | G06F 9/451 |
| 11,393,198 | B1 * | 7/2022 | Little | G06V 20/20 |
| 11,422,669 | B1 * | 8/2022 | Ravasz | G06F 3/013 |
| 11,436,828 | B1 * | 9/2022 | Little | G06Q 40/08 |
| 11,442,549 | B1 * | 9/2022 | Andorra | G06F 3/0236 |
| 11,449,189 | B1 * | 9/2022 | Bond | G06F 3/0482 |
| 2008/0228713 | A1 | 9/2008 | Emura et al. | |
| 2010/0177035 | A1 * | 7/2010 | Schowengerdt | G06F 1/163 345/156 |

(Continued)

*Primary Examiner* — Benyam Ketema
(74) *Attorney, Agent, or Firm* — Fernando & Partners, LLP

(57) ABSTRACT

In one implementation, a method of visualizing text is performed by a device including a display, one or more processors, and non-transitory memory. The method includes detecting a text input device at a first location within a volumetric environment. The method includes detecting selection of a text input field of a user interface displayed within the volumetric environment. The method includes displaying, on the display, a representation of the text input field at a second location within the volumetric environment associated with the first location of the text input device.

20 Claims, 13 Drawing Sheets

(56) References Cited

U.S. PATENT DOCUMENTS

| | | | | |
|---|---|---|---|---|
| 2011/0216060 A1* | | 9/2011 | Weising | A63F 13/00 345/419 |
| 2012/0154277 A1* | | 6/2012 | Bar-Zeev | G02B 27/017 345/158 |
| 2012/0154557 A1* | | 6/2012 | Perez | G06F 3/017 348/E13.001 |
| 2012/0235912 A1* | | 9/2012 | Laubach | G06F 3/0485 345/163 |
| 2012/0242581 A1* | | 9/2012 | Laubach | G06F 3/04812 345/173 |
| 2012/0249587 A1* | | 10/2012 | Anderson | G06F 3/04895 345/633 |
| 2013/0335303 A1* | | 12/2013 | Maciocci | G02B 27/017 345/8 |
| 2014/0035819 A1* | | 2/2014 | Griffin | G06F 3/0238 345/168 |
| 2014/0184550 A1* | | 7/2014 | Hennessey | G06F 3/041 345/173 |
| 2014/0327628 A1* | | 11/2014 | Tijssen | G06F 3/0488 345/173 |
| 2015/0248235 A1* | | 9/2015 | Offenberg | G06F 3/0237 715/773 |
| 2015/0269783 A1* | | 9/2015 | Yun | G06F 3/0304 345/633 |
| 2016/0027213 A1* | | 1/2016 | Burns | G06T 7/73 345/633 |
| 2016/0027215 A1* | | 1/2016 | Burns | G02B 27/0103 345/626 |
| 2016/0313866 A1 | | 10/2016 | Pacheco et al. | |
| 2016/0357252 A1* | | 12/2016 | Gavriliuc | H04N 13/332 |
| 2016/0379418 A1* | | 12/2016 | Osborn | G06T 19/20 345/589 |
| 2017/0038830 A1* | | 2/2017 | Clement | G06F 3/04847 |
| 2017/0061696 A1* | | 3/2017 | Li | G02B 27/017 |
| 2017/0075430 A1* | | 3/2017 | Hughes | G06F 3/04845 |
| 2017/0236330 A1* | | 8/2017 | Seif | G06F 3/04842 345/633 |
| 2017/0256096 A1* | | 9/2017 | Faaborg | G06T 19/003 |
| 2017/0262247 A1* | | 9/2017 | Yoganandan | G06F 3/1438 |
| 2017/0269722 A1* | | 9/2017 | Krishnakumar | G06F 3/0425 |
| 2017/0293351 A1* | | 10/2017 | Li | G06F 3/0236 |
| 2017/0315621 A1* | | 11/2017 | Yao | G06F 3/04883 |
| 2017/0329419 A1* | | 11/2017 | Dearman | G06F 3/0346 |
| 2017/0329515 A1* | | 11/2017 | Clement | G06F 3/011 |
| 2017/0364198 A1* | | 12/2017 | Yoganandan | G06F 3/04815 |
| 2018/0004297 A1* | | 1/2018 | Xu | G06T 19/006 |
| 2018/0101986 A1* | | 4/2018 | Burns | G06T 19/006 |
| 2018/0150997 A1* | | 5/2018 | Austin | G06F 3/0346 |
| 2018/0173323 A1* | | 6/2018 | Harvey | G06F 3/011 |
| 2019/0065026 A1* | | 2/2019 | Kiemele | A63F 13/92 |
| 2019/0114075 A1* | | 4/2019 | Jung | G06F 3/04842 |
| 2019/0146219 A1* | | 5/2019 | Rodriguez, II | G06F 3/0482 345/633 |
| 2019/0230297 A1* | | 7/2019 | Knorr | H04N 5/2224 |
| 2019/0310688 A1* | | 10/2019 | Richardson | G06T 19/006 |
| 2019/0340833 A1* | | 11/2019 | Furtwangler | G06F 3/013 |
| 2019/0377482 A1* | | 12/2019 | Shin | G06F 3/04845 |
| 2020/0042167 A1* | | 2/2020 | Bang | G06F 3/03547 |
| 2020/0074742 A1* | | 3/2020 | Rogers | G06T 19/006 |
| 2020/0082629 A1* | | 3/2020 | Jones | G02B 27/0172 |
| 2020/0082632 A1* | | 3/2020 | Burns | G02B 27/0172 |
| 2020/0174556 A1* | | 6/2020 | Kim | G06F 3/017 |
| 2020/0184653 A1* | | 6/2020 | Faulkner | G06T 7/40 |
| 2020/0201515 A1* | | 6/2020 | Moon | G06F 3/0346 |
| 2020/0249750 A1* | | 8/2020 | Choi | G06F 3/04812 |
| 2020/0258481 A1* | | 8/2020 | Woo | G06T 11/00 |
| 2020/0293120 A1* | | 9/2020 | Timonen | G06F 3/038 |
| 2020/0293166 A1* | | 9/2020 | Timonen | G06F 3/012 |
| 2020/0326847 A1* | | 10/2020 | Wang | G06F 3/0304 |
| 2021/0011621 A1* | | 1/2021 | Becker | G06F 3/04886 |
| 2021/0089139 A1* | | 3/2021 | Timonen | G06F 3/0484 |
| 2021/0097729 A1* | | 4/2021 | Palangie | G06T 5/20 |
| 2021/0382591 A1* | | 12/2021 | Timonen | G06F 3/1423 |
| 2022/0129139 A1* | | 4/2022 | Choi | G06F 1/163 |
| 2022/0261091 A1* | | 8/2022 | Berliner | G06F 3/013 |
| 2022/0269398 A1* | | 8/2022 | Casella | G06F 3/011 |
| 2022/0283667 A1* | | 9/2022 | Chakraborty | G06F 1/163 |

* cited by examiner

500

At a device including a display, one or more processors, and non-transitory memory: ⌐510

Detecting a text input device at a first location within a volumetric environment

Detecting selection of a text input field of a user interface displayed within the volumetric environment ⌐520

Displaying, via the display, a representation of the text input field at a second location within the volumetric environment associated with the first location of the text input device ⌐530

Figure 5

METHOD AND DEVICE FOR TYPING VISUALIZATION

CROSS-REFERENCE TO RELATED APPLICATIONS

This application is a continuation of U.S. patent application Ser. No. 17/506,862, filed on Oct. 21, 2021, which claims priority to U.S. Provisional Patent App. No. 63/105,494, filed on Oct. 26, 2020, which are both hereby incorporated by reference in their entirety.

TECHNICAL FIELD

The present disclosure generally relates to systems, methods, and devices for visualizing text proximate to a text input device.

BACKGROUND

In various implementations, a user may look away from a display and down at a keyboard while entering text. For example, the user may have difficulty typing unless looking at their hands, particularly in the case of a virtual keyboard which fails to provide the haptic feedback of a real keyboard.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is a flowchart representation of a method of visualizing text in accordance with some implementations.

Figure 1:
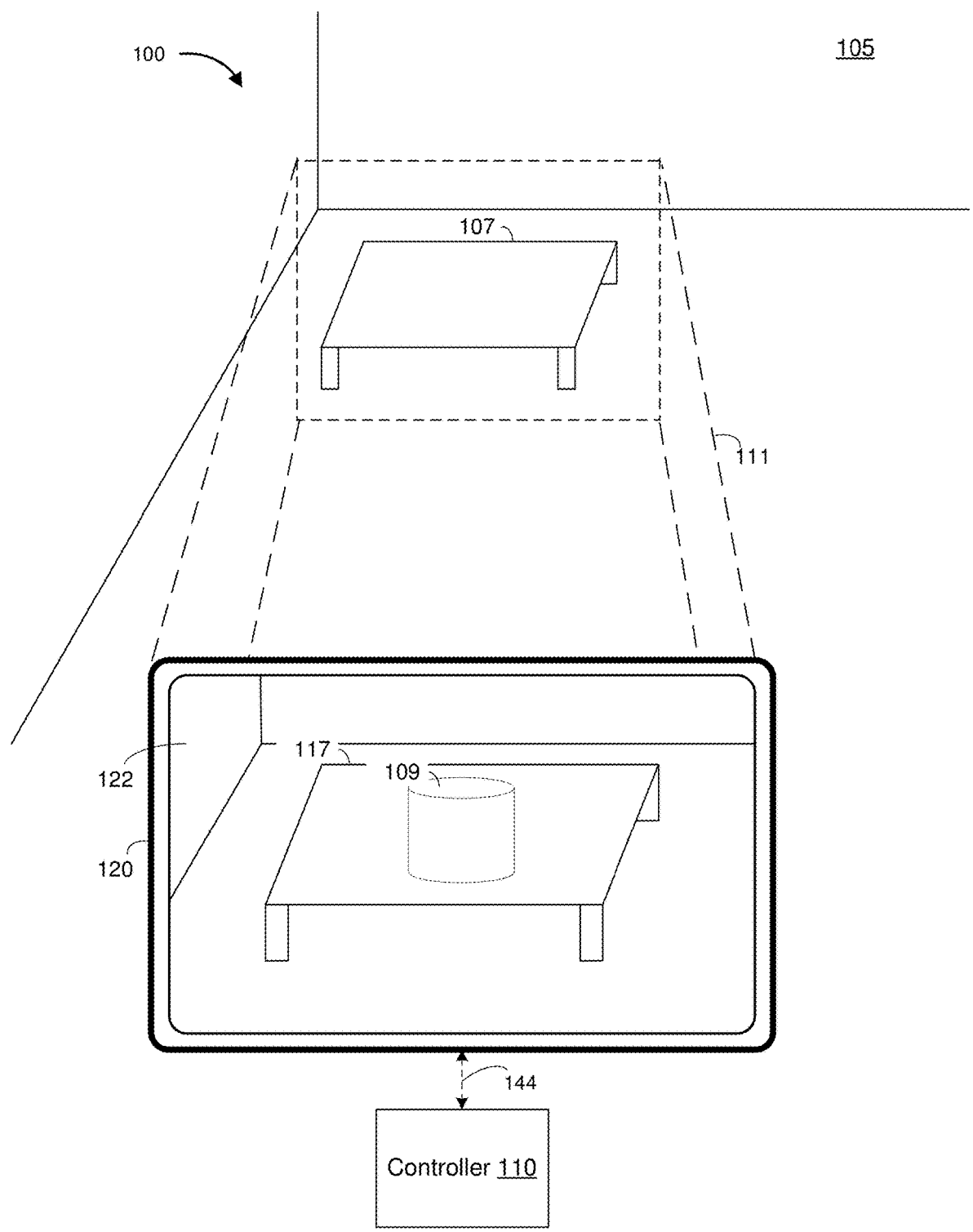
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for visualizing text. In various implementations, the method is performed by a device including a display, one or more processors, and non-transitory memory. The method includes detecting a text input device at a first location within a volumetric environment. The method includes detecting selection of a text input field of a user interface displayed within the volumetric environment. The method includes displaying, on the display, a representation of the text input field at a second location within the volumetric environment associated with the first location of the text input device.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

A physical environment refers to a physical place that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As an example, the XR system may detect movement of the electronic device presenting the XR environment (e.g., a mobile phone, a tablet, a laptop, a head-mounted device, and/or the like) and, in response, adjust graphical content and an acoustic field presented by the electronic device to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

In various implementations, an electronic device displays a representation of a selected text input field at a location proximate to a detected text input device. Accordingly, a user looking at the text input device (e.g., a keyboard) can concurrently see a representation of the text being input.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display an XR object (e.g., an XR cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
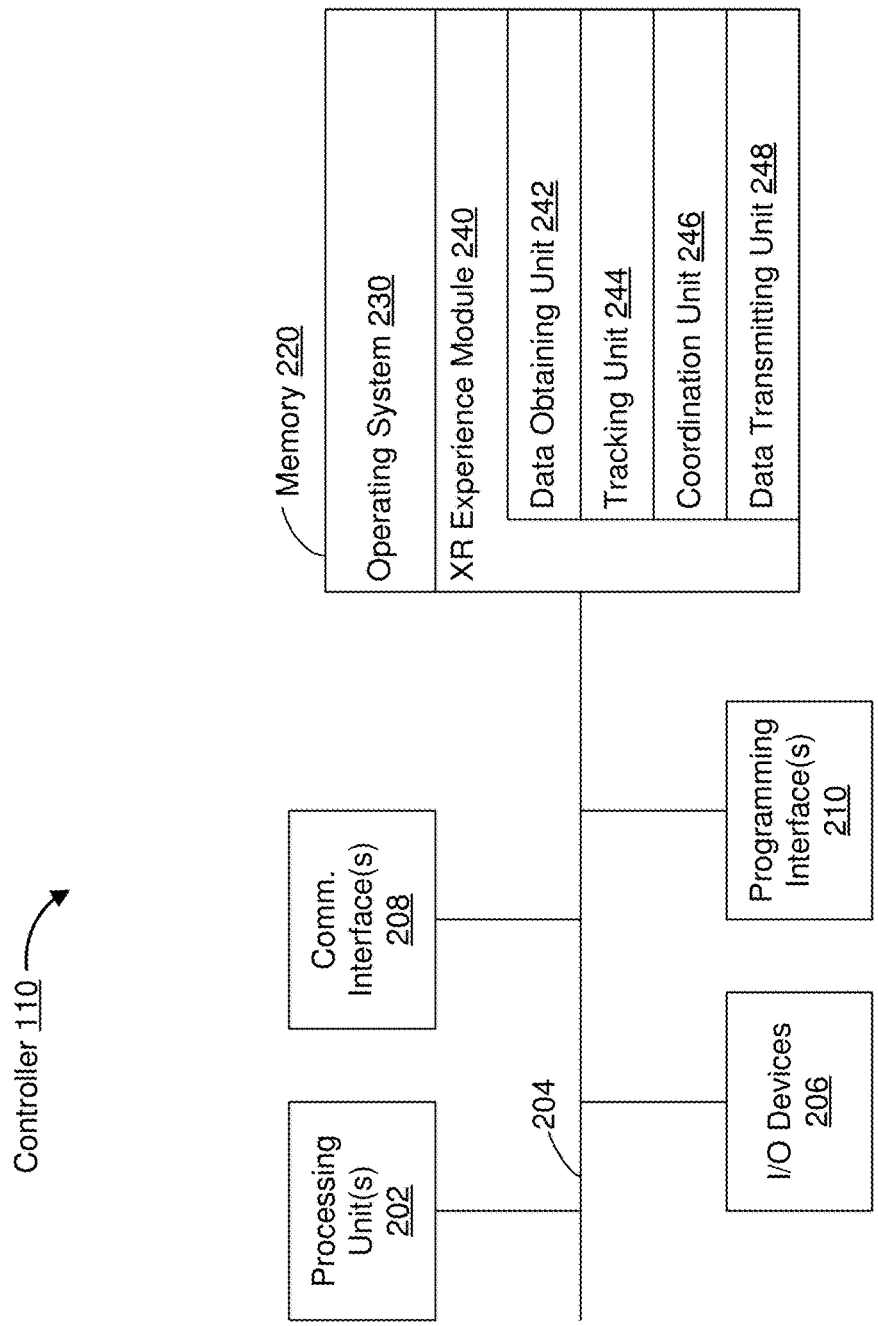
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
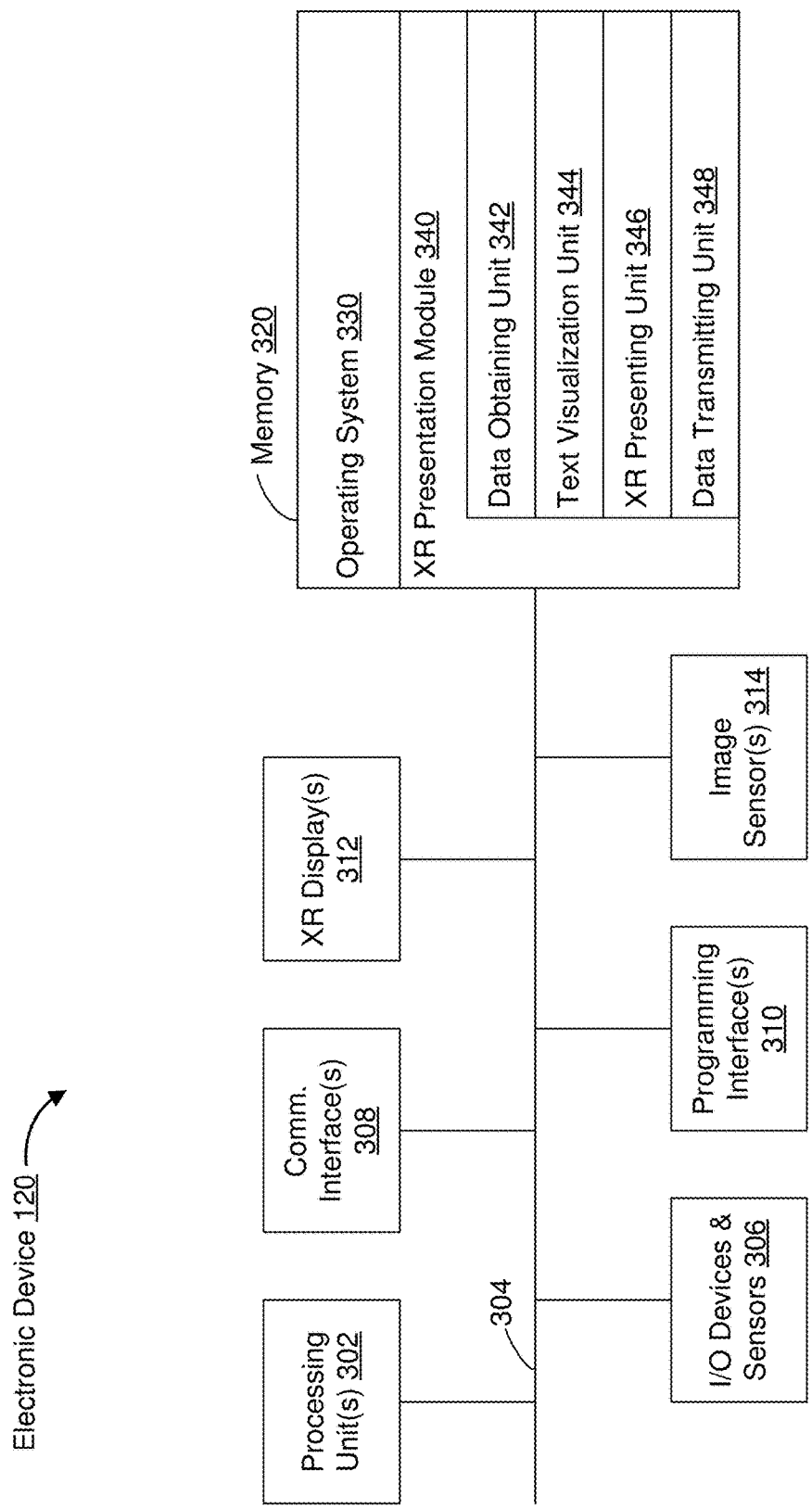
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, a text visualization unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the text visualization unit 344 is configured to detect a text input device and a selected text input field. To that end, in various implementations, the text visualization unit 344 includes instructions and/or logic therefor, and heuristics and metadata therefor.

In some implementations, the XR presenting unit 346 is configured to present XR content via the one or more XR displays 312, such as a representation of the selected text input field at a location proximate to the text input device. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. In some implementations, the data transmitting unit 348 is configured to transmit authentication credentials to the electronic device. To that end, in various implementations, the data transmitting unit 348 includes instructions and/or logic therefor, and heuristics and metadata therefor.

Although the data obtaining unit 342, the text visualization unit 344, the XR presenting unit 346, and the data transmitting unit 348 are shown as residing on a single device (e.g., the electronic device 120), it should be understood that in other implementations, any combination of the data obtaining unit 342, the text visualization unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIGS. 4A-4I illustrate an XR environment 400 based on a physical environment including a keyboard 413 and a display 414. FIGS. 4A-4I illustrate the XR environment 400 from the perspective of a user of an electronic device. In various implementations, the perspective of the user is from a location of an image sensor of the electronic device. For example, in various implementations, the electronic device is a handheld electronic device and the perspective of the user is from a location of the image sensor of the handheld electronic device directed towards the physical environment. In various implementations, the perspective of the user is from the location of a user of the electronic device. For example, in various implementations, the electronic device is a head-mounted electronic device and the perspective of the user is from a location of the user directed towards the physical environment, generally approximating the field-of-view of the user were the head-mounted electronic device not present. In various implementations, the perspective of the user is from the location of an avatar of the user. For example, in various implementations, the XR environment 400 is a virtual environment and the perspective of the user is from the location of an avatar or other representation of the user directed towards the virtual environment.

Figure 4A:
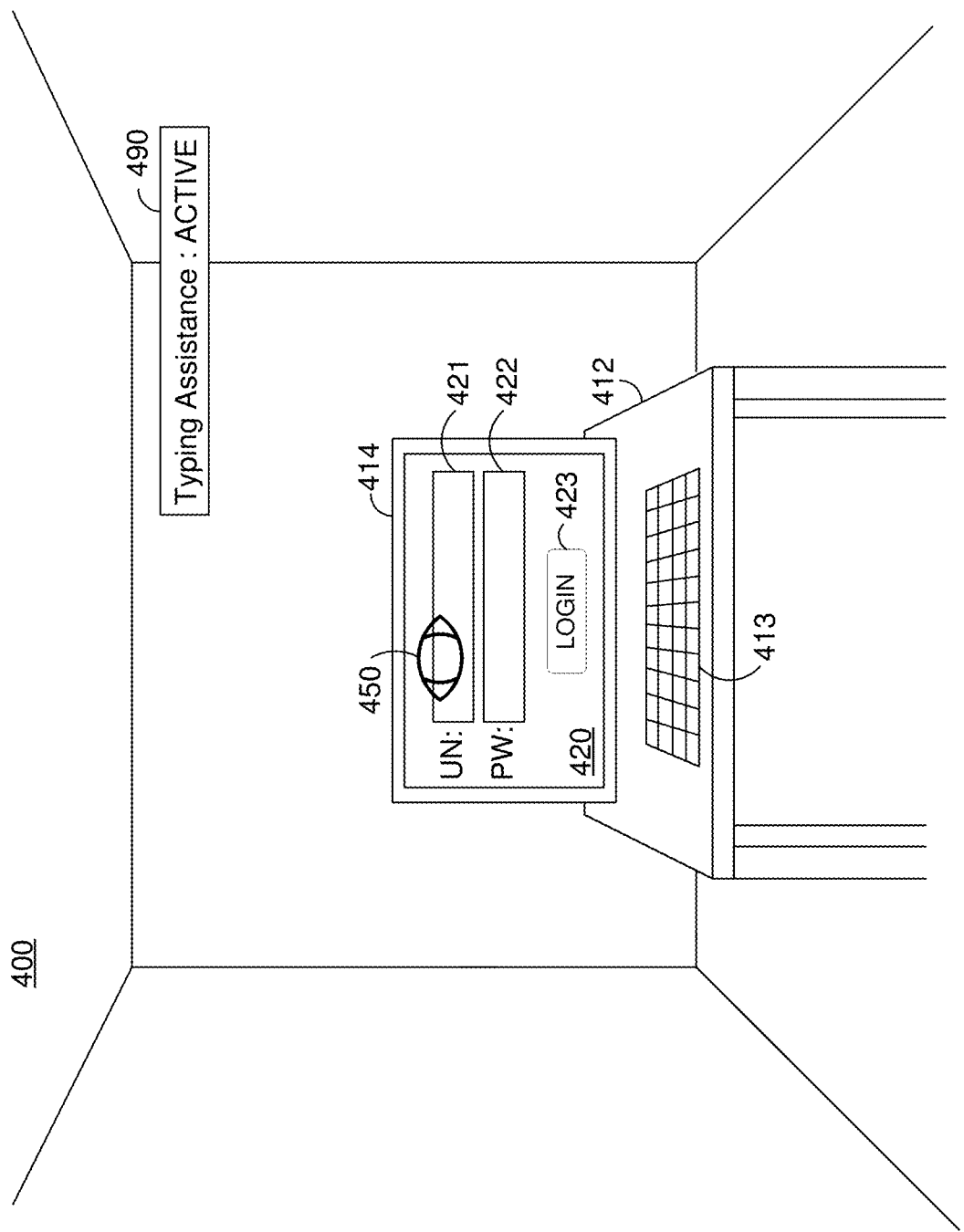
FIGS. 4A-4I illustrate an XR environment based on a physical environment including a display and a keyboard.

FIG. 4A illustrates the XR environment 400 during a first time period. In various implementations, the first time period is an instant, a fraction of a second, a few seconds, a few hours, a few days, or any length of time. During the first time period, the XR environment 400 includes a plurality of objects, including one or more real objects (e.g., a table 412, a keyboard 413, and a display 414) and one or more virtual objects (e.g., a gaze indicator 450 and a typing assistance indicator 490). In various implementations, certain objects (such as the real objects 412-414 and the gaze indicator 450) are displayed at a location in the XR environment 400, e.g., at a location defined by three coordinates in a three-dimensional (3D) XR coordinate system. Accordingly, when the user moves in the XR environment 400 (e.g., changes either position and/or orientation), the objects are moved on the display of the device, but retain their location in the XR environment 400. In various implementations, certain virtual objects (such as the typing assistance indicator 490) are displayed at locations on the display such that when the user moves in the XR environment 400, the objects are stationary on the display on the device. In some implementations, the table 412, the keyboard 413, the display 414, or any combination thereof, may be virtual objects.

During the first time period, the display 414 displays a user interface 420 including a username field 421, a password field 422, and a login button 423.

The gaze direction indicator 450 indicates a gaze direction of the user, e.g., where in the XR environment 400 the user is looking. Although the gaze direction indicator 450 is displayed in FIGS. 4A-4I, in various implementations, the gaze direction indicator 450 is not displayed.

During the first time period, the gaze direction indicator 450 is displayed over the username field 421 indicating that the user is looking at the username field 421 during the first time period.

The XR environment 400 includes the typing assistance indicator 490. During the first time period, the typing assistance indicator 490 indicates that typing assistance is active. In various implementations, a user can activate or deactivate typing assistance. When typing assistance is active, the XR environment 400 includes, if various other conditions are met, computer-generated representations of selected text input fields. When typing assistance is inactive, the XR environment 400 does not include such computer-generated representations of selected text input fields.

Figure 4B:
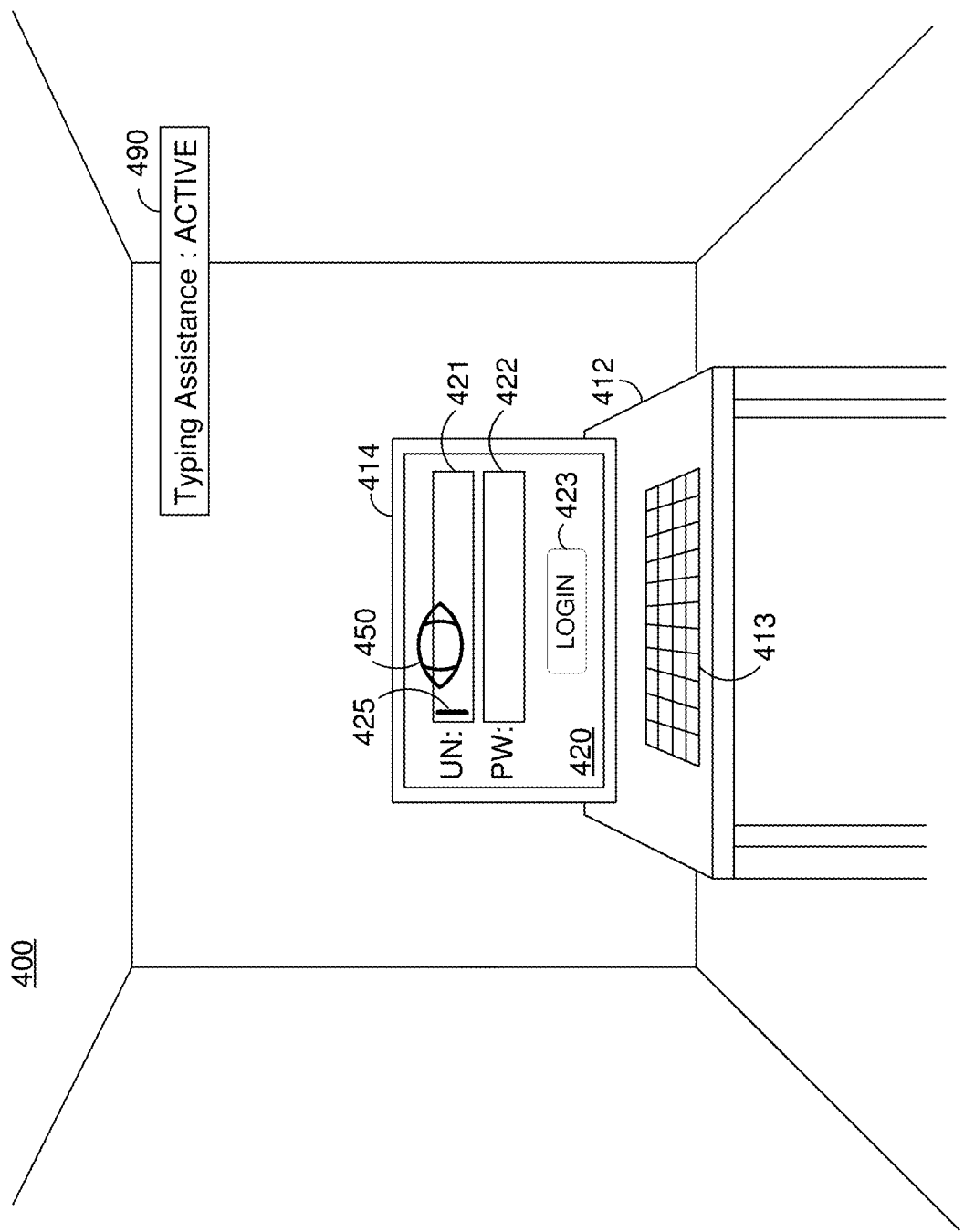

FIG. 4B illustrates the XR environment 400 during a second time period subsequent to the first time period. In various implementations, the second time period is an instant, a fraction of a second, a few seconds, a few hours, a few days, or any length of time. During the second time period, in response to selection of the username field 421, the user interface 420 displayed by the display 414 includes a cursor 425 within the username field 421. During the second time period, the username field 421 is selected, as indicated by the cursor 425 within the username field 421.

During the second time period, the gaze indicator 450 remains displayed over the username field 421.

Figure 4C:
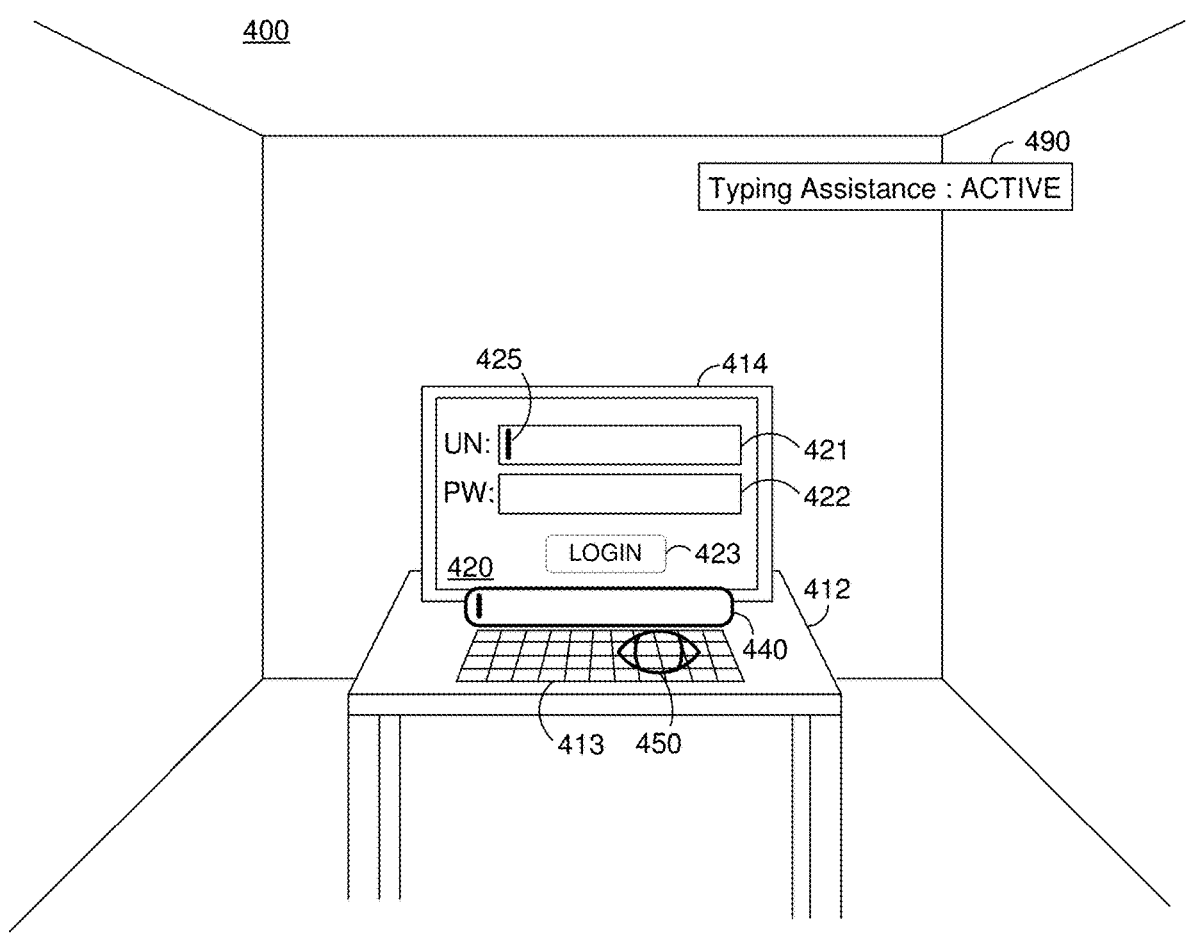

FIG. 4C illustrates the XR environment 400 during a third time period subsequent to the second time period. In various implementations, the second time period is an instant, a fraction of a second, a few seconds, a few hours, a few days, or any length of time. During the third time period, in response to the gaze of the user being directed to the keyboard 413 (as indicated by the gaze indicator 450 being displayed over the keyboard 413), the XR environment 400 includes a text visualization object 440 displayed proximate to the keyboard 413.

In various implementations, the text visualization object 440 is displayed in response to other triggers. For example, in various implementations, the text visualization object 440 is displayed in response to typing assistance being active. As another example, in various implementations, the text visualization object 440 is displayed proximate to where the gaze of the user is directed in response to detecting user input via the keyboard 413 while the gaze of the user is not directed to the active text field (e.g., the username field 421). For example, if the user is transcribing a printed document and gazing at the printed document, the text visualization object 440 is displayed proximate to the printed document while user input is directed to a text input field of a word processing application.

In various implementations, the text visualization object 440 is a virtual object displayed at a location in the XR environment 400. Accordingly, when the user moves in the XR environment 400 (e.g., changes either position and/or orientation), the text visualization object 440 is moved on the display of the device, but retains its location in the XR environment 400. Thus, the text visualization object 440 is displayed at the same location in the XR environment from multiple perspectives.

Figure 4D:
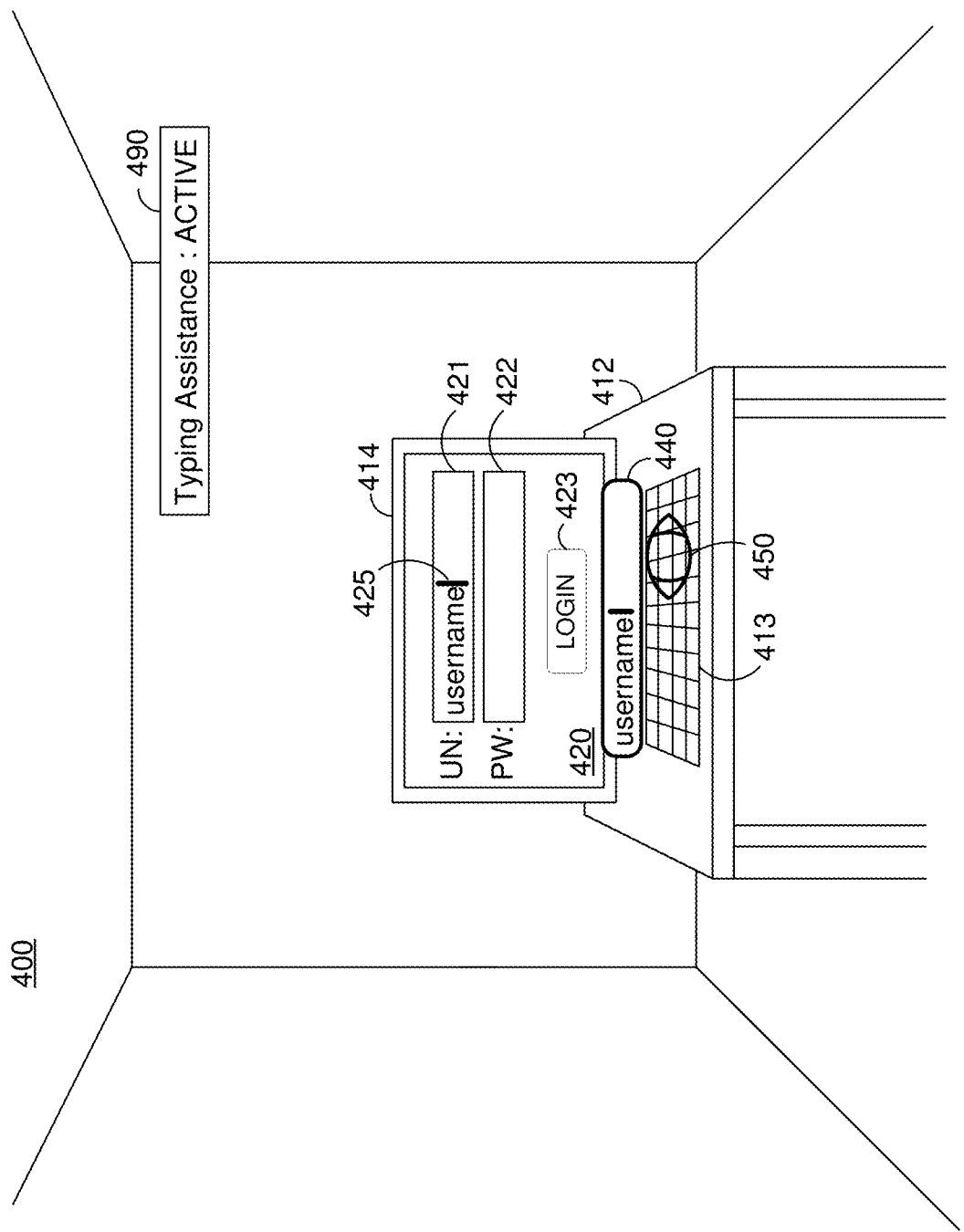

FIG. 4D illustrates the XR environment 400 during a fourth time period subsequent to the third time period. In various implementations, the fourth time period is an instant, a fraction of a second, a few seconds, a few hours, a few days, or any length of time. During the fourth time period, in response to the user input received via the keyboard 413, the username field 421 includes text reading "username". Similarly, the text visualization object 440 includes the same text. Thus, the text visualization object 440 is a representation of the username field 421.

Figure 4E:
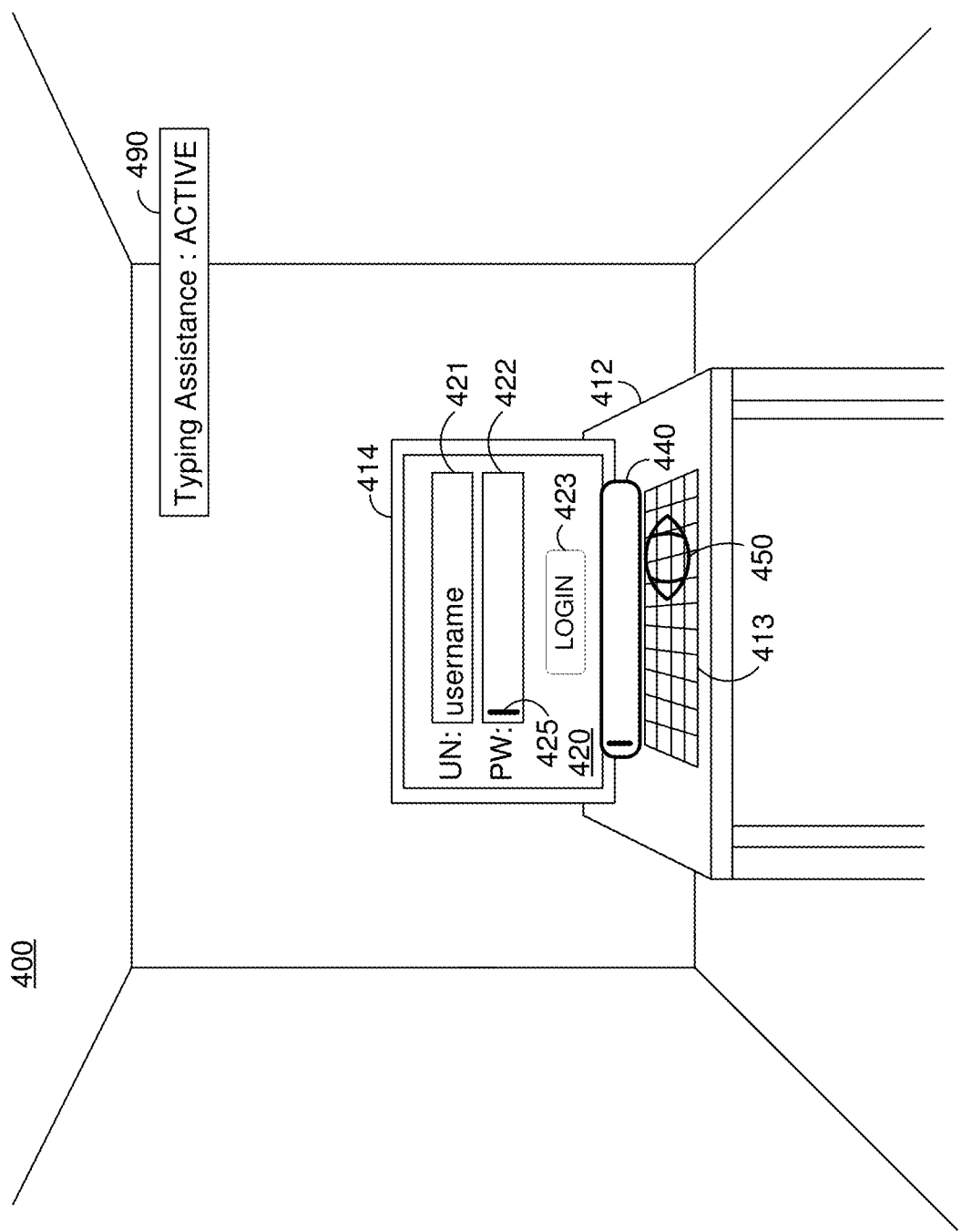

FIG. 4E illustrates the XR environment 400 during a fifth time period subsequent to the fourth time period. In various implementations, the fifth time period is an instant, a fraction of a second, a few seconds, a few hours, a few days, or any length of time. During the fifth time period, in response to selection of the password field 422, the password field 422 includes the cursor 425. During the fifth time period, in response to the gaze of the user being directed to the keyboard 413 (as indicated by the gaze indicator 450 being displayed over the keyboard 413), the text visualization object 440 is displayed. During the fifth time period, as the password field 422 is blank, the text visualization object 440, as a representation of the password field 422, is also blank.

Figure 4F:
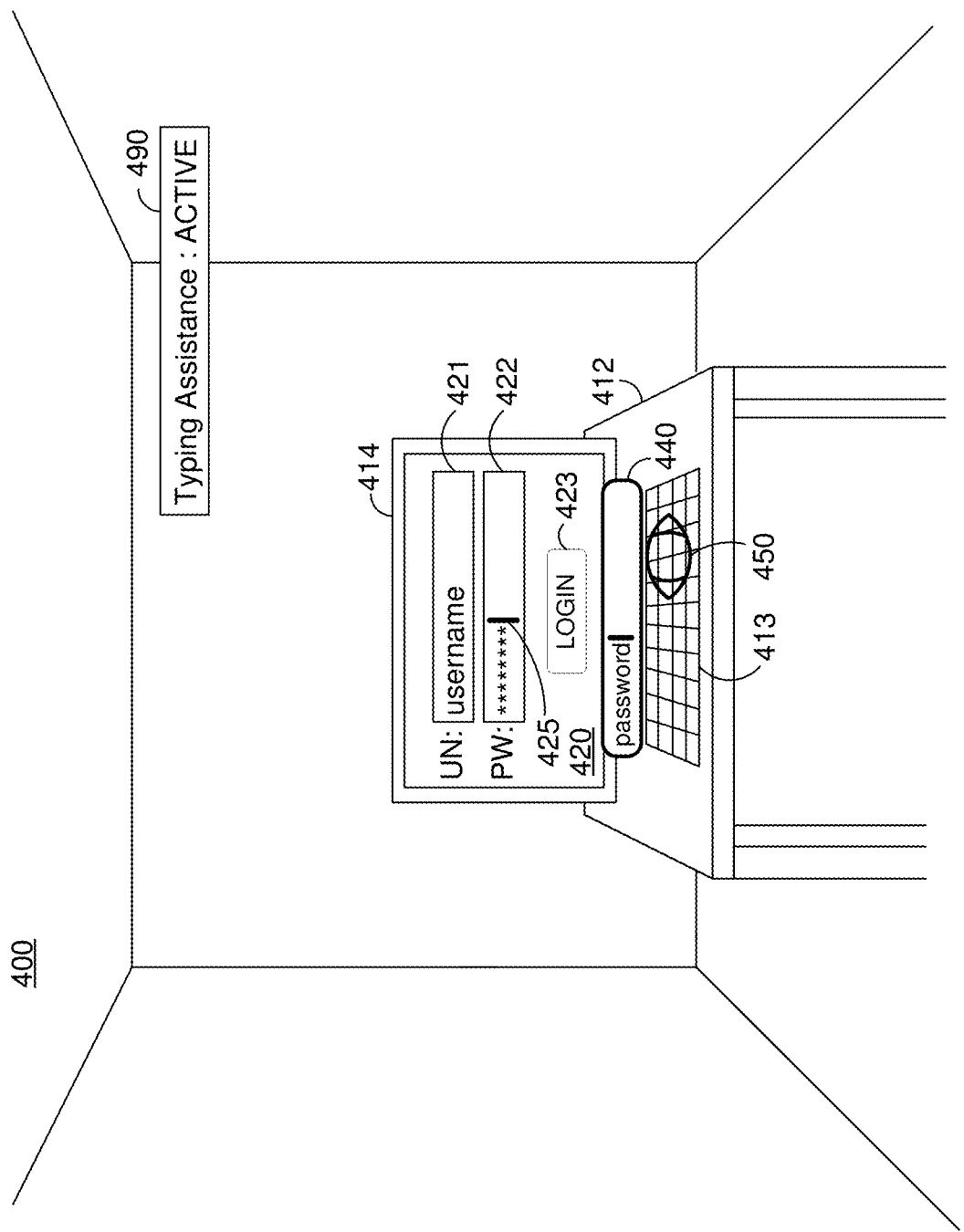

FIG. 4F illustrates the XR environment 400 during a sixth time period subsequent to the fifth time period. In various implementations, the sixth time period is an instant, a fraction of a second, a few seconds, a few hours, a few days, or any length of time. During the sixth time period, in response to user input received via the keyboard 413, the password field 422 includes obscured text, e.g., a series of asterisks or bullets, corresponding to the user input. In contrast, the text visualization object 440 includes unobscured text corresponding to the user input, e.g., text reading "password".

Figure 4G:
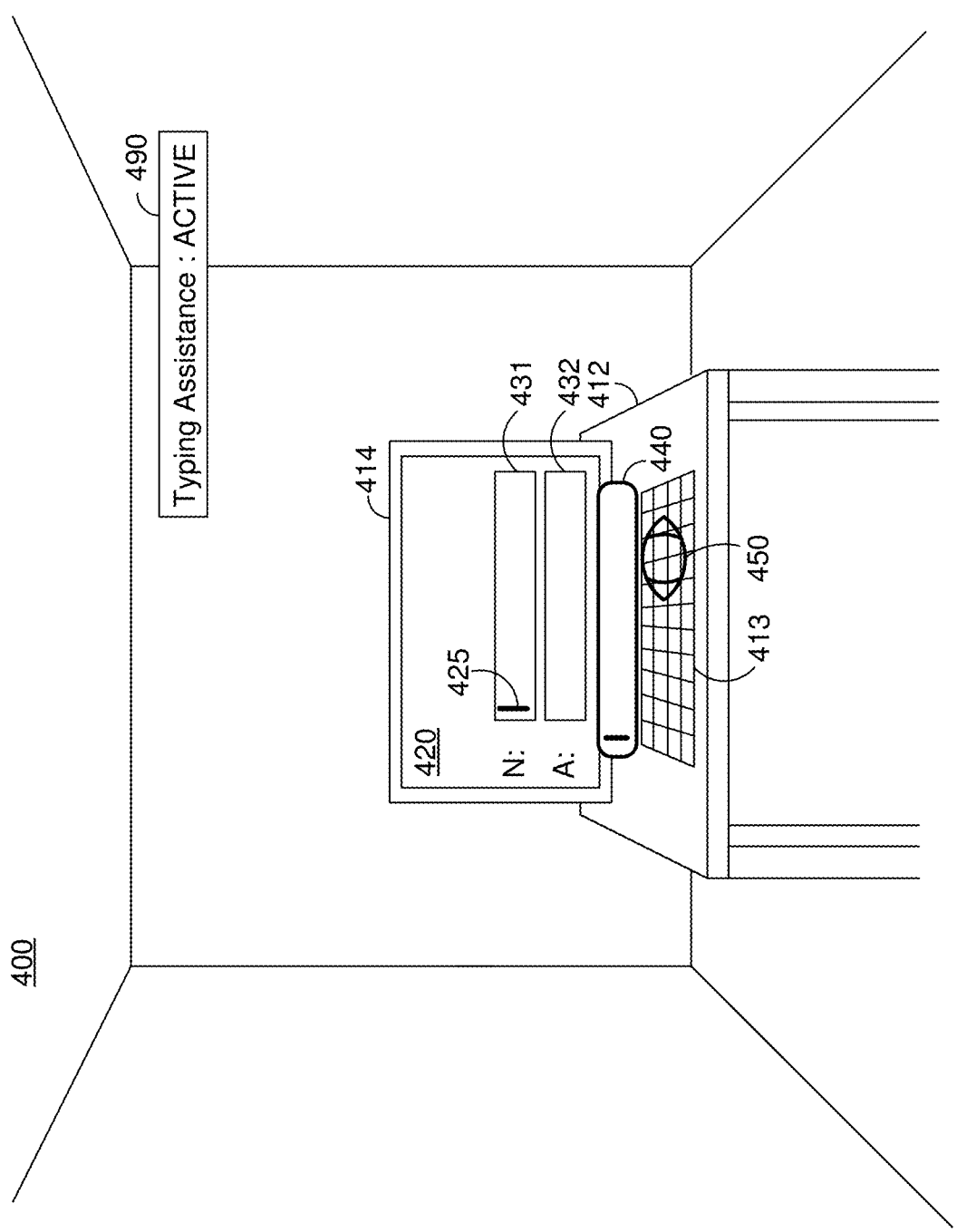

FIG. 4G illustrates the XR environment 400 during a seventh time period subsequent to the sixth time period. In various implementations, the seventh time period is an instant, a fraction of a second, a few seconds, a few hours, a few days, or any length of time. During the seventh time period, in response to selection of the login button 423, the user interface 420 includes a name field 431 and an address field 432. During the seventh time period, the name field 431 is selected, as indicated by the cursor 425 within the name field 431. During the seventh time period, in response to the gaze of the user being directed to the keyboard 413 (as indicated by the gaze indicator 450 being displayed over the keyboard 413), the text visualization object 440 is displayed. During the seventh time period, as the name field 431 is blank, the text visualization object 440, as a representation of the name field 431, is also blank.

Figure 4H:
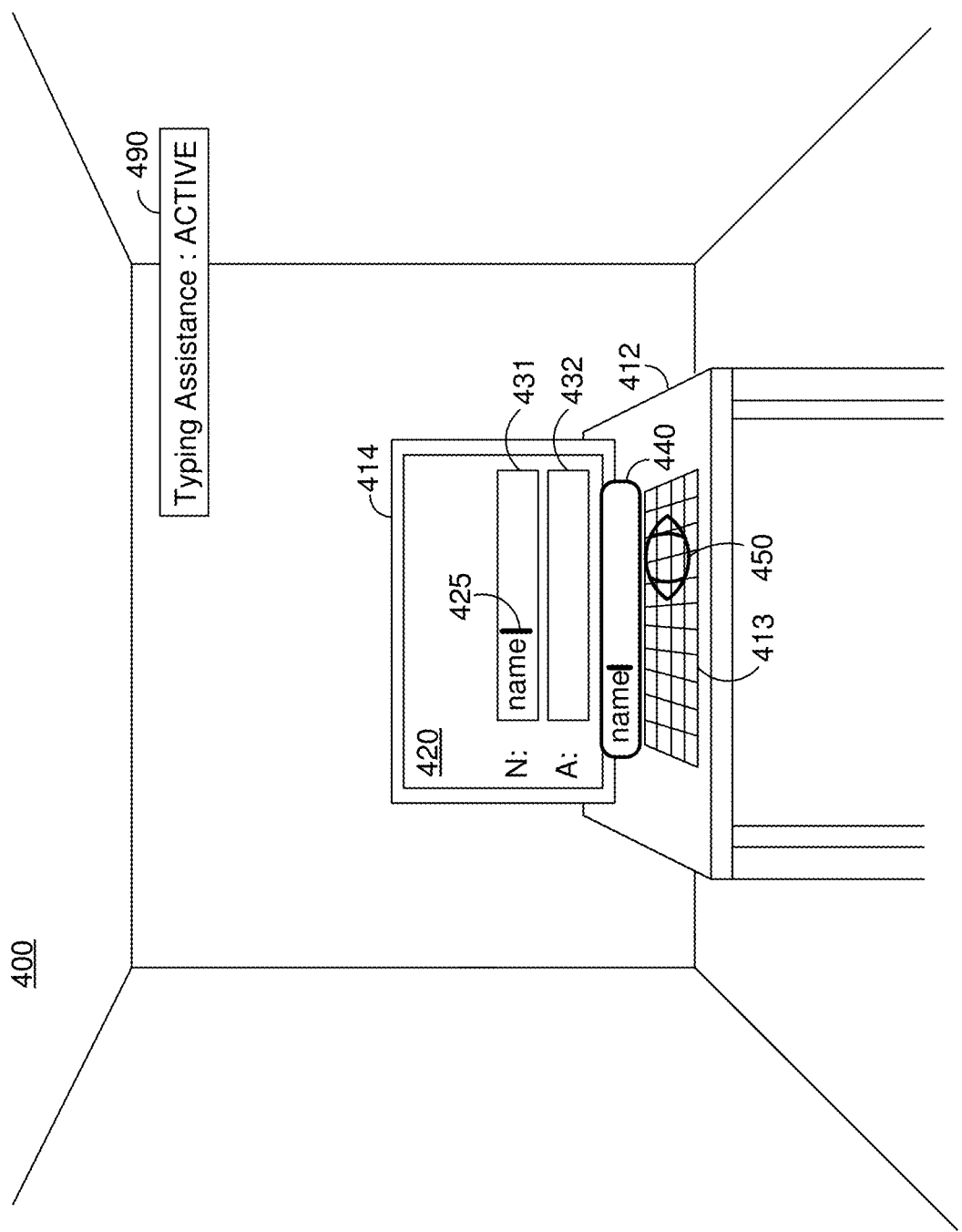

FIG. 4H illustrates the XR environment 400 during an eighth time period subsequent to the seventh time period. In various implementations, the eighth time period is an instant, a fraction of a second, a few seconds, a few hours, a few days, or any length of time. During the eighth time period, in response to user input received via the keyboard 413, the name field 431 includes text reading "name". Similarly, the text visualization object 440 includes text reading "name".

Figure 4I:
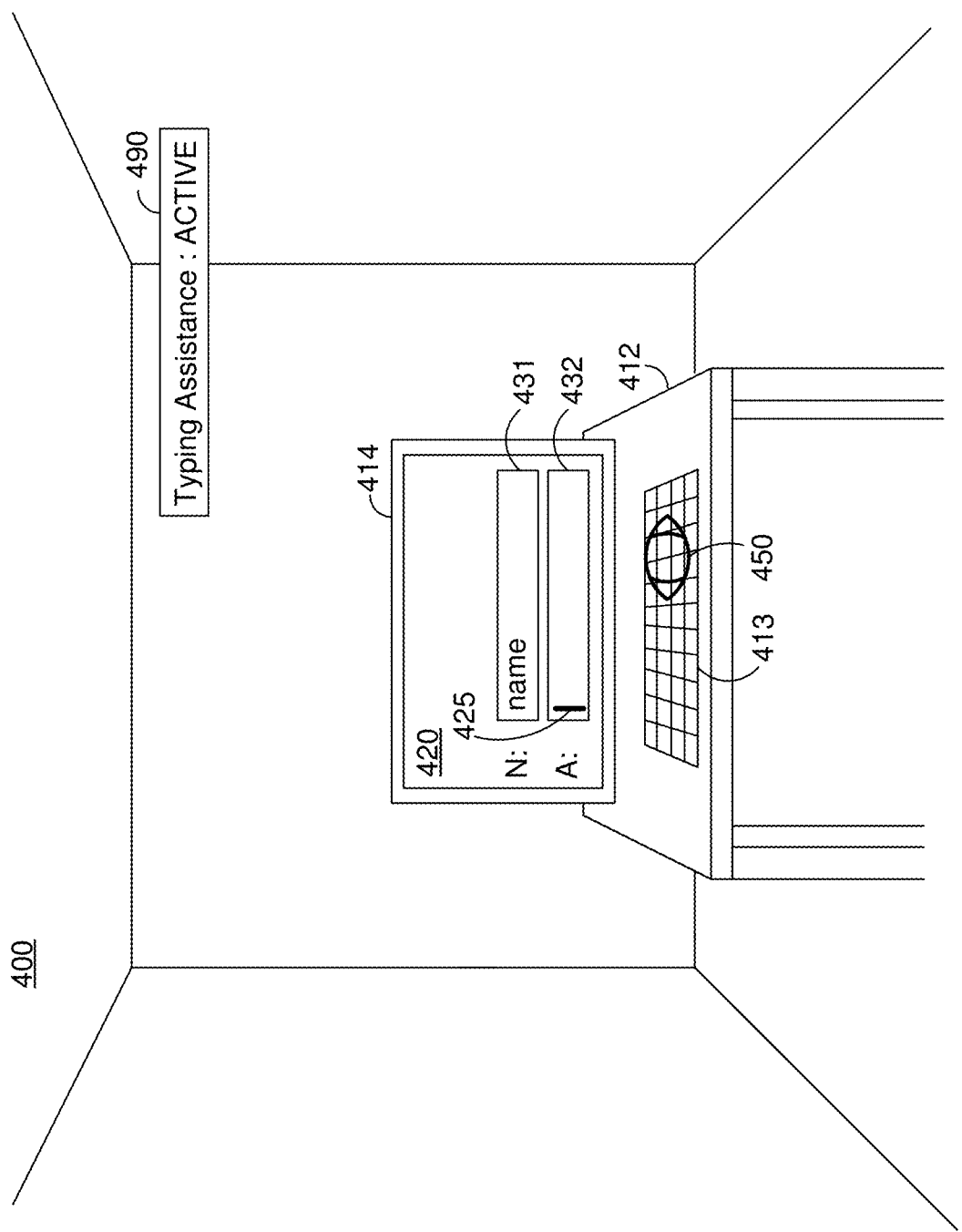

FIG. 4I illustrates the XR environment 400 during a ninth time period subsequent to the eighth time period. In various implementations, the ninth time period is an instant, a fraction of a second, a few seconds, a few hours, a few days, or any length of time. During the ninth time period, in response to selection of the address field 432, the cursor 425 is displayed in the address field 432. Further, during the ninth time period, the text visualization object 440 is not displayed. In various implementations, the text visualization object 440 is displayed when the selected text input field is at least a threshold distance away from the keyboard 413. Thus, in FIG. 4H, because the name field 431 is displayed at least the threshold distance away from the keyboard 413, the text visualization object 440 is displayed. However, in FIG. 4I, because the address field 432 is displayed less than the threshold distance away from the keyboard 413, the text visualization object 440 is not displayed. In various implementations, the text visualization object 440 is displayed less than the threshold distance away from the keyboard 413. In various implementations, the threshold distance is based on the field-of-vision of the user. For example, in various implementations, the threshold distance is based on a transition from central to paracentral vision or from paracentral to near-peripheral vision. Accordingly, in various implementations, the threshold distance is a measure of degrees rather than meters.

In various implementations, to maintain a consistent user experience, the text visualization object 440 is displayed even when the selected text input field is less than the threshold distance away. For example, in various implementations, if the text visualization object 440 was displayed for a first text field (e.g., the name field 431) that is at least the threshold distance away, the text visualization object 440 is displayed for a second text field (e.g., the address field 432) that is less than the threshold distance away.

FIG. 5 is a flowchart representation of a method 500 of visualizing text in accordance with some implementations. In various implementations, the method 500 is performed by a device including a display, one or more processors, and non-transitory memory (e.g., the electronic device 120 of FIG. 3). In some implementations, the method 500 is performed by processing logic, including hardware, firmware, software, or a combination thereof. In some implementations, the method 500 is performed by a processor executing instructions (e.g., code) stored in a non-transitory computer-readable medium (e.g., a memory).

The method 500 begins, in block 510, with the device detecting a text input device at a first location within a volumetric environment. For example, in FIG. 4C, an electronic device detects the keyboard 413 within the XR environment 400. In various implementations, the text input device is a keyboard. In various implementations, the text input device is a numeric keypad. In various implementations, the text input device includes a plurality of keys respectively corresponding to a plurality of alphanumeric characters.

In various implementations, the volumetric environment is a physical environment, an XR environment, or a virtual environment. In various implementations, the text input device is a physical text input device. In various implementations, detecting the text input device includes detecting the text input device in an image of the volumetric environment. For example, in various implementations, the device detects the text input device using object recognition on an image of the volumetric environment captured with an image sensor of the device. In various implementations, the text input device is a virtual text input device generated and displayed by the device. In various implementations, detecting the text input device includes displaying the text input device at the first location within the volumetric environment.

The method 500 continues, in block 520, with the device detecting selection of a text input field of a user interface displayed within the volumetric environment. For example, in FIG. 4C, the username field 421 of the user interface 420 is selected as indicated by the presence of the cursor 425 within the username field 421. In various implementations, the user interface is displayed on a physical display. In various implementations, the user interface is displayed on a virtual display generated and displayed by the device. In various implementations, detecting selection of the text input field includes displaying the user interface.

The method 500 continues, in block 530, with the device displaying, on the display, a representation of the text input field at a second location within the volumetric environment associated with the first location of the text input device. For example, in FIG. 4C, the device displays the text visualization object 440 as a representation of the username field 421.

In various implementations, displaying the representation of the text input field is performed in response to detecting selection of the text input field (in block 520). In various implementations, displaying the representation of the text input field is performed in response to detecting a gaze of a user directed to the first location of the text input device. In various implementations, displaying the representation of the text input field is performed in response to determining that the text input field is at a third location within the volumetric environment at least a threshold distance from the first location of the text input device. Further, in various implementations, the second location of the representation of the text input field is within the threshold distance from the first location of the text input device.

In various implementations, the representation of the text input field is displayed close to or proximate to the text input device. Thus, in various implementations, the second location of the representation of the text input field is close to or proximate to the first location of the text input device. In various implementations, the representation of the text input field is displayed adjacent to or partially overlapping the text input device. In various implementations, a user is able to see both the text input device and the representation of the text input field at the same time. Thus, in various implementations, the second location of the representation of the text input field is within a field-of-view encompassing the first location of the text input device. In various implementations, the field-of-view is a central field-of-view.

In various implementations, the representation of the text input field is a virtual object displayed at the second location within the volumetric environment. In various implementations, the representation of the text input field is displayed at the second location at a plurality of different perspectives.

In various implementations, the method 500 further includes receiving user input via the text input device. The method 500 further includes displaying, in the text input field, first text corresponding to the user input and displaying, in the representation of the text input field, second text corresponding to the user input. In various implementations, the first text is the same as the second text. In various implementations, the first text is obscured text (e.g., a series of asterisks or bullets) and the second text is unobscured text. Thus, sensitive information, such as a password or identifying information, is displayed to the user of the device, but not in the user interface where others may see it.

In various implementations, the text input field may span multiple lines, such as for entry of an address or to edit a document in a word processing application. In various implementations, the representation of the text input field represents a subset of the text input field. For example, in various implementations, the representation of the text input field includes a single line. In various implementations, the representation of text input field includes multiple lines, such as two lines or three lines.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including an image sensor, display, one or more processors, and non-transitory memory:
    capturing, using the image sensor, an image of a physical environment;
    displaying, on the display, an XR environment including a user interface composited with the image of the physical environment, wherein the user interface includes a text input field displayed at a first location in the XR environment;
    determining, using the image of the physical environment, a second location in the XR environment of a physical text input device; and
    displaying, on the display, a representation of the text input field at a third location within the XR environment based on the second location.

2. The method of claim 1, wherein displaying the representation of the text input field is performed in response to detecting selection of the text input field.

3. The method of claim 1, wherein displaying the representation of the text input field is performed in response to detecting a gaze of a user directed to the first location of the text input device.

4. The method of claim 1, wherein displaying the representation of the text input field is performed in response to determining that the first location of the text input field is at least a threshold distance from the second location of the text input device.

5. The method of claim 4, wherein the third location of the representation of the text input field is within the threshold distance of the second location of the text input device.

6. The method of claim 1, wherein the third location of the representation of the text input field is proximate to the second location of the text input device.

7. The method of claim 1, wherein the third location of the representation of the text input field is within a field-of-view encompassing the second location of the text input device.

8. The method of claim 1, further comprising:
    detecting motion of the device; and
    moving, on the display, the representation of the text input field to maintain display at the third location within the XR environment.

9. The method of claim 1, further comprising:
    receiving user input via the text input device;
    displaying, in the text input field, first text corresponding to the user input; and
    displaying, in the representation of the text input field, second text corresponding to the user input.

10. The method of claim 9, wherein the first text is the same as the second text.

11. The method of claim 9, wherein the first text is obscured text and the second text is unobscured text.

12. The method of claim 9, wherein the second text is a subset of the first text.

13. The method of claim 1, wherein the representation of the text input field represents a subset of the text input field.

14. The method of claim 13, wherein the text input field spans multiple lines and the representation of the text input field spans a single line.

15. A device comprising:
    an image sensor;
    a display;
    a non-transitory memory; and
    one or more processors to:
        capture, using the image sensor, an image of a physical environment;
        display, on the display, an XR environment including a user interface composited with the image of the physical environment, wherein the user interface includes a text input field displayed at a first location in the XR environment;
        determining, using the image of the physical environment, a second location in the XR environment of a physical text input device; and
        displaying, on the display, a representation of the text input field at a third location within the XR environment based on the second location.

16. The device of claim 15, wherein the third location of the representation of the text input field is proximate to the second location of the text input device.

17. The device of claim 15, wherein the third location of the representation of the text input field is within a field-of-view encompassing the second location of the text input device.

18. The device of claim 1, wherein the one or more processors are further to:
   detect motion of the device; and
   move, on the display, the representation of the text input field to maintain display at the third location within the XR environment.

19. The device of claim 15, wherein the one or more processors are further to:
   receive user input via the text input device;
   display, in the text input field, first text corresponding to the user input; and
   display, in the representation of the text input field, second text corresponding to the user input.

20. A non-transitory memory storing one or more programs, which, when executed by one or more processors of a device including an image sensor and a display, cause the device to:
   capture, using the image sensor, an image of a physical environment;
   display, on the display, an XR environment including a user interface composited with the image of the physical environment, wherein the user interface includes a text input field displayed at a first location in the XR environment;
   determining, using the image of the physical environment, a second location in the XR environment of a physical text input device; and
   displaying, on the display, a representation of the text input field at a third location within the XR environment based on the second location.

* * * * *